US006450518B1

(12) United States Patent
Howard

(10) Patent No.: US 6,450,518 B1
(45) Date of Patent: Sep. 17, 2002

(54) WHEELCHAIR

(76) Inventor: Jerald R. Howard, 5413 N. 46th Pl., Phoenix, AZ (US) 85018

(*) Notice: Subject to any disclaimer, the term of this patent is extended or adjusted under 35 U.S.C. 154(b) by 0 days.

(21) Appl. No.: 09/571,127

(22) Filed: May 15, 2000

Related U.S. Application Data

(60) Provisional application No. 60/136,581, filed on May 28, 1999.

(51) Int. Cl.7 .................................................. B62M 1/14
(52) U.S. Cl. ..................................... 280/246; 280/304.1
(58) Field of Search ............................. 280/242.1, 244, 280/246, 247, 248, 304.1, 250.1

(56) References Cited

U.S. PATENT DOCUMENTS

| | | | | | |
|---|---|---|---|---|---|
| 838,228 | A | | 12/1906 | Williams | |
| 882,248 | A | * | 3/1908 | Haas | |
| 1,550,479 | A | * | 8/1925 | Wiora | |
| 2,643,898 | A | | 6/1953 | Everest et al. | |
| 3,301,574 | A | | 1/1967 | Good | |
| 3,381,973 | A | * | 5/1968 | Carr | 280/250.1 |
| 3,415,531 | A | | 12/1968 | Kiel | |
| 3,945,449 | A | * | 3/1976 | Ostrow | 180/6.5 |
| 3,953,054 | A | | 4/1976 | Udden et al. | |
| 4,471,972 | A | * | 9/1984 | Young | 280/244 |
| 4,544,200 | A | | 10/1985 | Dunn et al. | |
| D294,476 | S | | 3/1988 | Michel et al. | |
| 4,735,431 | A | * | 4/1988 | Tait | 280/242.1 |
| 4,811,964 | A | | 3/1989 | Horn | |
| 4,865,344 | A | * | 9/1989 | Romero, Sr. et al. | 280/242.1 |
| 4,890,853 | A | | 1/1990 | Olson | |
| 5,004,259 | A | | 4/1991 | Ayers et al. | |
| 5,007,655 | A | | 4/1991 | Hanna | |
| 5,197,152 | A | * | 3/1993 | Rose et al. | 4/479 |
| 5,356,172 | A | | 10/1994 | Levy et al. | |
| 5,568,933 | A | * | 10/1996 | Mizuno | 280/250.1 |
| 5,577,753 | A | * | 11/1996 | Pociask | 280/250.1 |
| 5,718,442 | A | | 2/1998 | Alexander et al. | |
| 5,873,589 | A | * | 2/1999 | Hallett | 224/412 |

* cited by examiner

*Primary Examiner*—Kevin Hurley
(74) *Attorney, Agent, or Firm*—Charles E. Cates; Elizabeth A. Dawn

(57) ABSTRACT

A wheelchair including three component parts: a propulsion means, a support means provided with means for receiving the legs of a chair, and a chair. The propulsion means is removably engaged with the support means by sliding the propulsion means into the support means. The propulsion means includes a ratchet and sprocket means. The occupant propels the wheelchair forward and backward by moving a handle attached to the ratchet in a rowing type motion. A chair is then engaged with the support means by inserting the chair legs into the means for receiving the chair legs on the support. The means located on the support for receiving chair legs can be varied to accommodate a variety of chair types. The chair is optionally provided with a central opening for facilitating toilet use.

11 Claims, 4 Drawing Sheets

FIG.. 1.

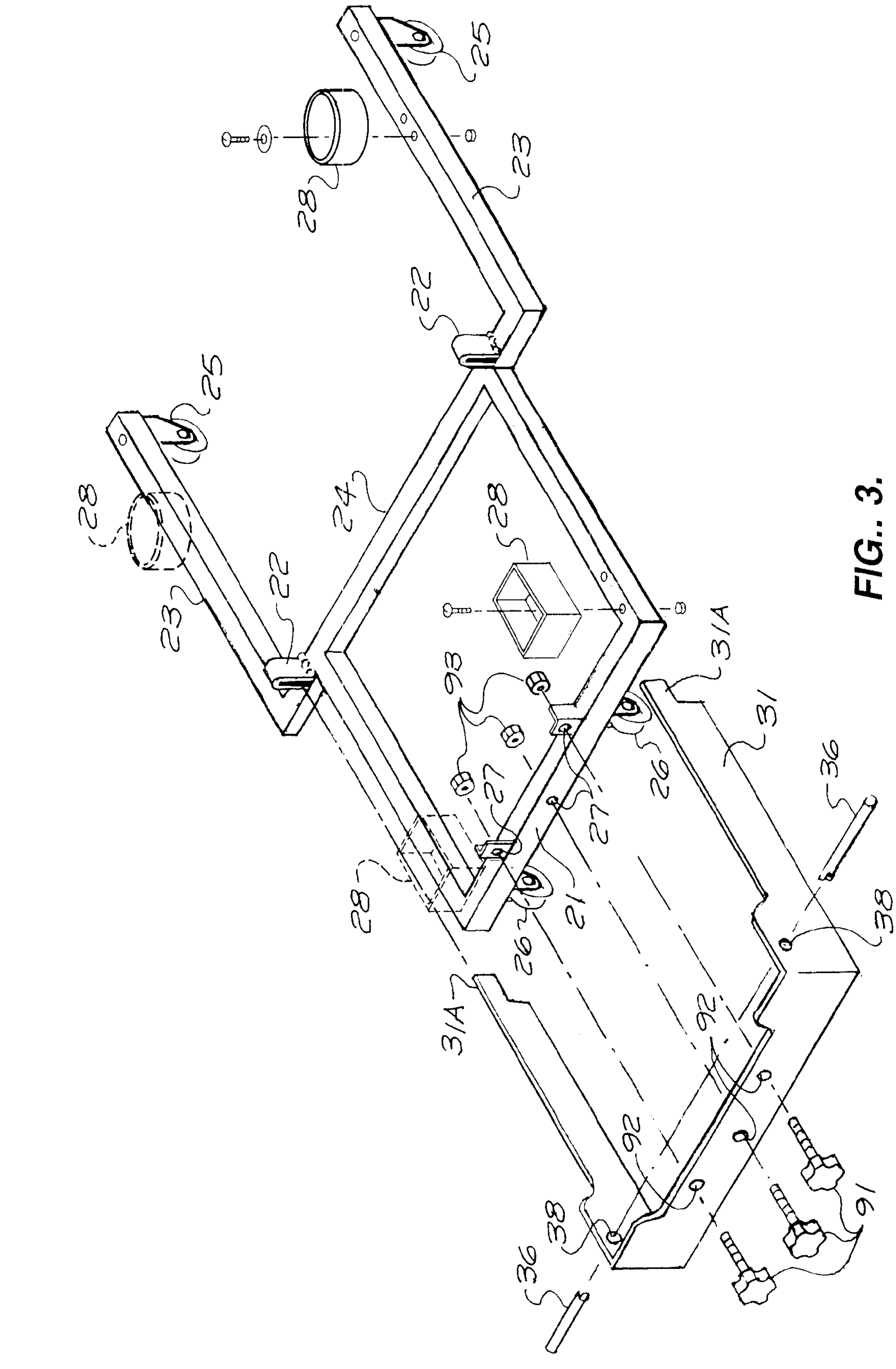
FIG.. 3.

WHEELCHAIR

This Non-Provisional Application claims the benefit of U.S. Provisional Application Serial No. 60/136,581 filed on May 28, 1999. This invention relates to an occupant propelled wheelchair comprising three separable and interchangeable components.

BACKGROUND OF THE INVENTION

As is well known in the art, a conventional wheelchair has two large, rear wheels on either side of a seat while small caster wheels are positioned on either side of a footrest. Such a wheelchair is generally propelled either by a person, such as an attendant, pushing from behind, or by the occupant pushing against the large, rear wheels. In order to facilitate occupant propulsion of the wheelchair, many conventional wheelchairs have rims which project outward from the rear wheels for grasping and pushing. Although viable in many types of environments, such conventional wheelchairs have several disadvantages. First, the use of conventional wheelchairs for an extended period of time can cause wrist and rotor cuff injuries to the occupant due to the repetitive need to angle the wrist and then push to provide forward locomotion. Further, conventional wheelchairs are typically braked by the occupant grabbing and holding the wheel or the turning rim attached to the wheel. When the wheel is turning at a rapid rate, grabbing the wheel may cause friction burns and grabbing the wheel rim may cause injury to the hand.

In order to overcome the problems described above, occupant propelled wheelchairs which use a rowing mechanism to provide propulsion have been proposed. An example is shown in U.S. Pat. No. 4,811,964 to Horn which teaches a wheelchair with a single reciprocating rowing lever in which power strokes are developed in both the pull and the push direction.

Although wheelchairs which use a rowing mechanism, such as the patent to Horn, provide a good means of locomotion, the locomotion means is still limited to a single wheelchair. Wheelchairs can be a very expensive purchase. The cost of a wheelchair can prevent some of those in need of a wheelchair from having access to a means of locomotion. As the propulsion means with its levers and gears is often the most expensive component of a wheelchair system, it is desirable to have a propulsion means which is capable of providing locomotion to more than one wheelchair. U.S. design Pat. No. 294,476 to Michel et al. teaches a modular wheelchair base without propulsion means. However, in order to provide the occupant with independence, it is desirable to have a wheelchair base which allows for occupant propulsion.

U.S. Pat. No. 838,228 to Williams discloses a chair truck and self contained propelling means therefor. The chair truck disclosed in Williams is adapted for carrying various sizes of rocking chairs and is provided with means controlled by the occupant whereby the chair may be moved about in any direction. In order to best provide locomotion to more than one wheelchair it is desirable to have a propulsion means which can slip into and out of engagement with a support means. A chair is then releasably engaged with the support means. It is further desirable that the support means be mobile so that the support means with a chair mounted thereon can be pushed by an attendant when the propulsion means is not engaged with the support means.

SUMMARY OF THE INVENTION

The wheelchair of the present invention includes three component parts: a propulsion means, a mobile support means provided with means for receiving the legs of a chair, and a chair. The propulsion means is removably engaged with the support means by sliding the propulsion means into the support means. A chair is then engaged with the support means by inserting the chair legs into the means for receiving the chair legs on the support. The means located on the support for receiving chair legs can be varied to accommodate a variety of chair types.

BRIEF DESCRIPTION OF THE DRAWINGS

FIG. 3 is an exploded perspective view of the support means and part of the propulsion means.

DETAILED DESCRIPTION OF THE DRAWINGS

Figure 1:
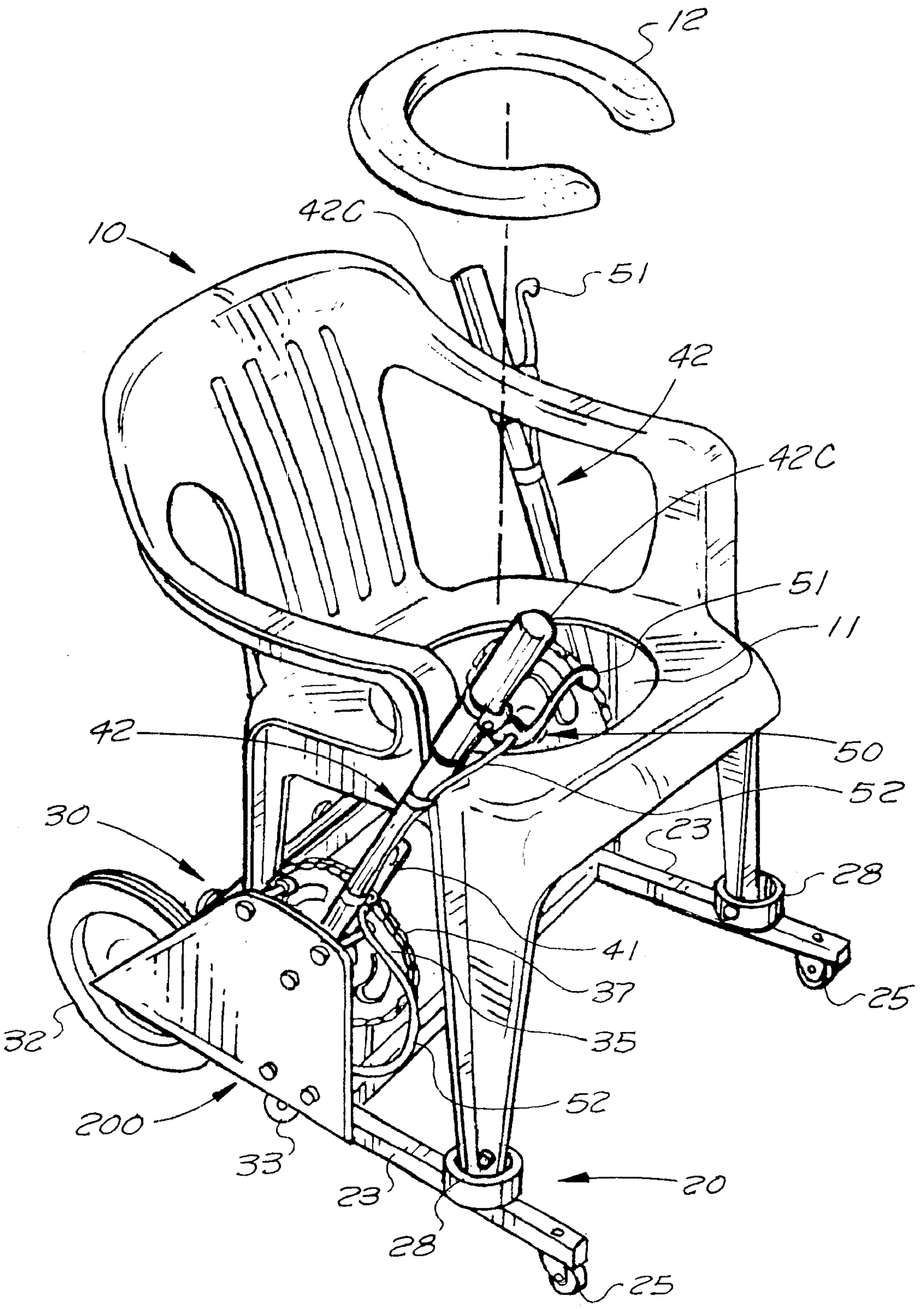
FIG. 1 is a front perspective view of the wheelchair of the present invention showing the chair mounted on the support means and the support means engaged with the propulsion means.

As shown in FIG. 1, the wheelchair of the present invention comprises chair 10, mobile support means 20, and propulsion means 30. In order to facilitate use of the wheelchair without the need for remodeling of buildings, it is important that the total width of the wheelchair when support means 20 is engaged with propulsion means 30 be less wide than a standard door.

Figure 2:
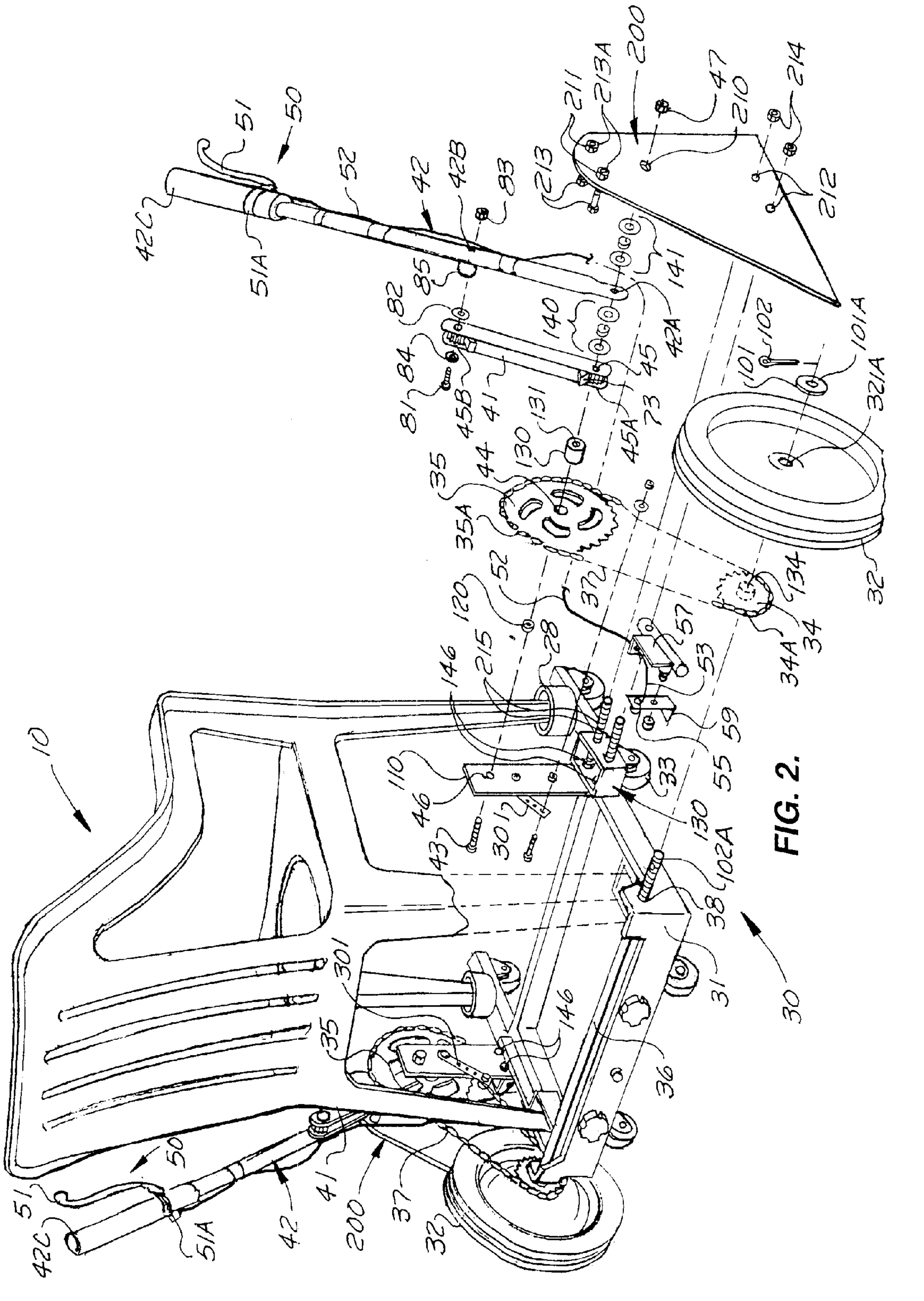
FIG. 2 is a rear exploded perspective view of the present invention.
Figure 4:
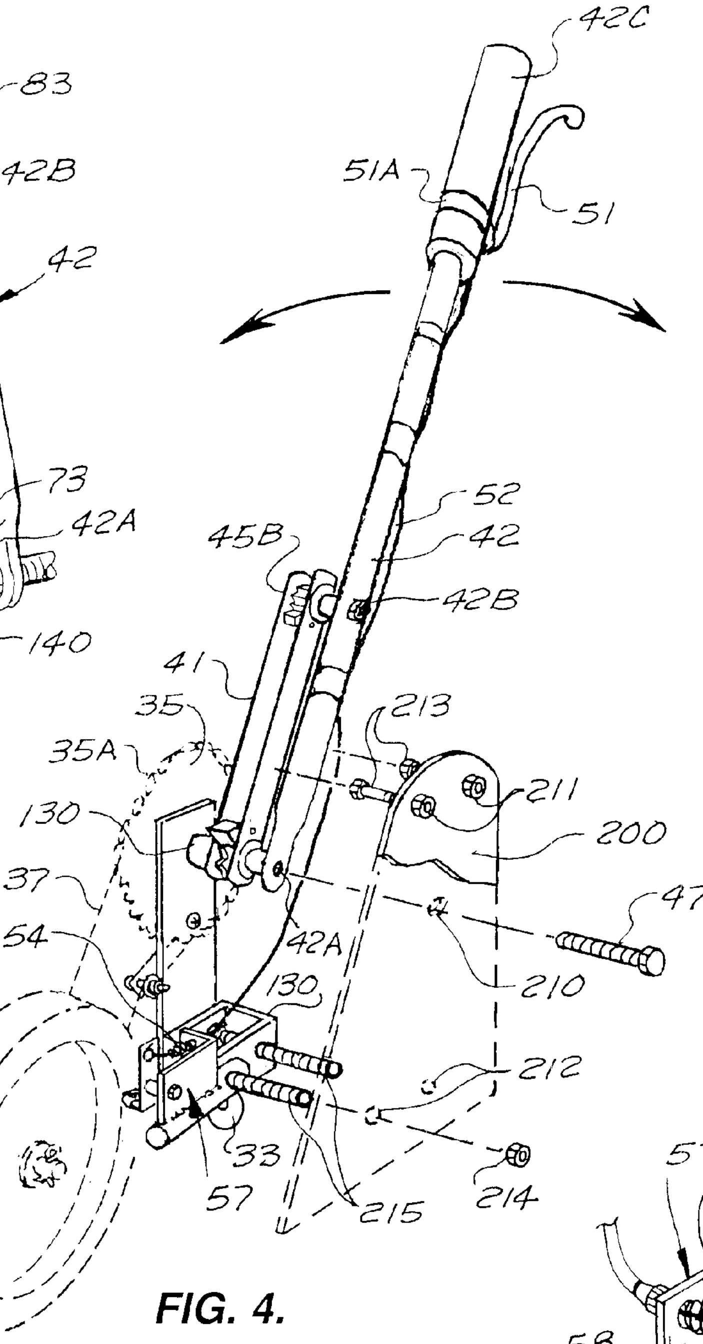
FIG. 4 is an exploded perspective view of part of the propulsion means.
Figure 6:
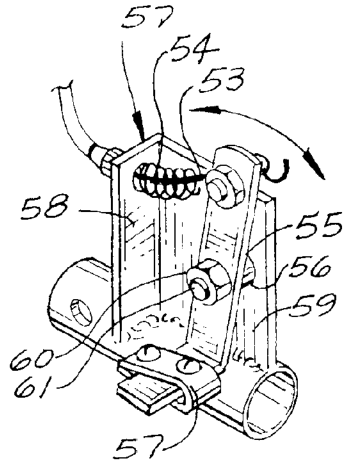
FIG. 6 is a perspective view showing part of the braking assembly.

As shown best in FIGS. 2, 3 and 4, propulsion means 30 includes U-shaped frame 31, rear wheels 32, front casters 33, axle 36, driven sprocket wheel 34, driving sprocket wheel 35, chain 37, ratchet 41, handle 42, vertical support member 110, plate 200, and long bolt 43. Frame 31 is provided with finger like protrusions 31A for engagement with brackets 22 of support means 20.

The ratchet and sprocket assembly is used to move propulsion means forward and backward. An identical ratchet and sprocket means as well as the braking means are used on either side of propulsion means 30. Accordingly, the following description will refer to only one side of propulsion means 30, it being understood that the two sides of propulsion means 30 are identical.

As shown in FIGS. 2 and 3, rear wheel 32 is rotatably connected to frame 31 by axle 36. Axle 36 is mounted to frame 31 by inserting axle 36 through each of openings 38 in frame 31. On each side of frame 31, after passing through opening 38, axle 36 passes through opening 134 in driven sprocket wheel 34 and opening 32A in rear wheel 32. Axle 36 then passes through opening 101A in spacer 101. Lastly, pin 102 is inserted into bore 102A on axle 36 to hold the axle in position.

As shown in FIGS. 2 and 4, front casters 33 are mounted to frame 31 by means of wheel mount boxes 130. Casters 33 are attached to the underside of boxes 130.

Figure 5:
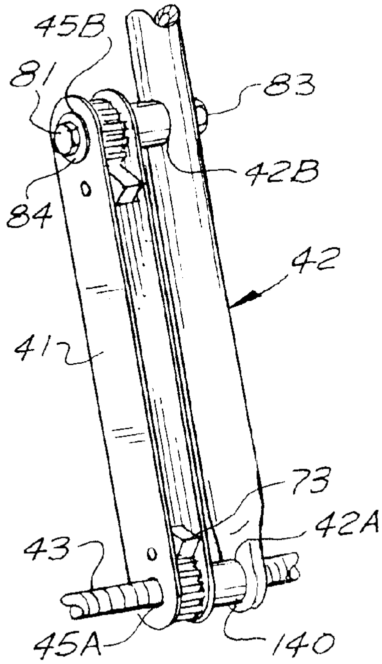
FIG. 5 is a perspective view showing the ratchet assembly.

Driven sprocket wheel 34 is operably connected by chain 37 to driving sprocket wheel 35. As shown in FIGS. 2, 4 and 5, driving sprocket wheel 35 is turned by the action of ratchet 41. Ratchet 41 is a commercially available ratchet which can be purchased at most hardware stores. Ratchet 41 is provided with bolt engaging orifice 45A at a first end and bolt engaging orifice 45B at a second end. Ratchet 41 is operably connected to driving sprocket wheel 35 by hexagonal bolt 130. One end of hexagonal bolt 130 is permanently engaged within bolt engaging orifice 45A of ratchet 41. The opposite end of hexagonal bolt 130 is welded to driving wheel 35.

As shown best in FIGS. 2 and 4, propulsion means 30 also includes handle 42. Handle 42 is provided with lower bolt hole 42A and upper bolt hole 42B. Handle 42 is further provided with gripping area 42C. Lower bolt hole 42A is aligned and connected with engaging orifice 45A at the first end of ratchet 41. Upper bolt hole 42B of handle 42 is aligned with and connected to engaging orifice 45B at the second end of ratchet 41.

As shown best in FIG. 2, propulsion means 30 also includes rectangular vertical support member 110. Vertical support 110 is mounted to frame 31 and functions to stabilize ratchet 41 and driving wheel 35. Vertical support 110 is provided with upper bolt hole 46 and lower bolt holes 146. Chain guide 301 is mounted to vertical support 110. Chain 37 passes over guide 301, which functions to keep chain 37 in alignment.

As shown in FIGS. 1, 2, and 4, propulsion means 30 also includes plate 200. Plate 200 is provided with upper bolt holes 211, middle bolt hole 210, and lower bolt holes 212. Bolts 213 are positioned within upper bolt holes 211 and extend perpendicularly a distance from plate 200. Bolts 213 are held in position by nuts 213A. The range of motion of handle 42 is determined by the space between bolts 213. Bolts 213 should be spaced so that there is sufficient distance between the bolts to operate handle 42 and ratchet 41, but the distance between bolts 213 should not be so great that handle 42 can fall backward or forward out of convenient reach of a person seated in chair 10. In part, plate 200 is affixed to vertical support 110 by means of the two bolts 215 which pass through holes 146 in support 110, through wheel mount box 130, through holes 212 in plate 200 and into nuts 214.

One end of ratchet 41 is mounted to driving sprocket 35 and handle 42 by inserting long bolt 43 through upper bolt hole 46 in vertical support 110, through a spacer 120, through opening 44 in the center of driving sprocket wheel 35, through bore 131 in hexagonal bolt 130, through the bolt engaging orifice 45A in a first end of ratchet 41, through a first set of spacers 140, through opening 42A in handle 42, through a second set of spacers 141, and finally through hole 210 in plate 200. The terminal end of bolt 43 is secured by nut 47 on the side of plate 200 opposite driving sprocket wheel 35 and ratchet 41.

The second end of ratchet 41 is mounted to handle 42 by inserting bolt 81 through washer 84, through bolt engaging orifice 45B, through a second washer 82, through a spacer 85, through upper bolt hole 42B of handle 42, and finally into nut 83, which secures the terminal end of bolt 81.

As shown best in FIGS. 4 and 5, pushing handle 42 in a rowing motion causes driving sprocket wheel 35 to be turned by the action of ratchet 41. Driving sprocket wheel 35 is operably connected to driven sprocket wheel 34 by chain 37. Chain 37 is positioned on teeth 35A of driving sprocket wheel 35 and teeth 34A of driven sprocket wheel 34. As driving sprocket wheel 35 is turned by the action of handle 42 and ratchet 41, chain 37 is turned along with driving sprocket wheel 35. Chain 37, connected to driven sprocket wheel 34 by teeth 34A, causes driven sprocket wheel 34 to turn.

As shown in FIGS. 2 and 4, driven sprocket wheel 34 is operably connected to rear wheel 32 such that turning driven sprocket wheel 34 also causes rear wheel 32 to turn. Rear wheel 32 is also free-wheeling so that frame 31 can be pushed forward from behind without the necessity of employing the ratchet and sprocket means described above.

By employing a rowing motion with handle 42, ratchet 41 engages hexagonal bolt 130 and causes driving sprocket wheel 35 to be pushed forward a distance. Ratchet 41 further includes selector 73. By changing the position of selector 73, the ratchet is changed from turning the driving sprocket wheel in a forward direction to turning the driving sprocket wheel 35 in a backward direction. Thus, the wheelchair occupant is able to selectively determine his direction of travel. By positioning selector 73 on one side of propulsion means 30 in the forward direction and the selector 73 on the other side of the propulsion means in the backward direction and then moving handles 42 on both sides of the propulsion means, the propulsion means can be made to spin on its own axis. Ratchets with selectors which allow the user to selectively determine the direction in which bolt being ratcheted is turned are commonly available in hardware stores.

In order to provide stopping means for propulsion means 30, propulsion means 30 is provided with braking means 50. Braking means 50 includes brake handle 51, exterior cable 52, interior cable 53, spring 54, brake fitting 57, brake arm 55, and brake foot 59. Brake handle 51 is pivotally mounted on gripping portion 42C of handle 42 by means of bracket 51A. Brake arm 55 is pivotally mounted to side wall 59 of brake fitting 57 at pivot point 56. Brake fitting 57 is mounted on wheel mount box 130 adjacent to rear wheel 32. Exterior cable 52 surround interior cable 53 with interior cable 53 being slidable within the exterior cable. Brake handle 51 is operably connected to interior cable 53. Interior cable 53 is attached at one end to brake handle 51. At its opposite end, interior cable 53 passes through an opening in back wall 58 of brake fitting 57 and is joined with a first end of brake arm 55. At one end, exterior cable 52 is joined with bracket 51A with its opposite end being jointed to the back wall 58 of brake fitting 57. Spring 54 surrounds that portion of interior cable 53 which extends between back wall 58 and the brake arm. Brake foot 59 is formed at a second end of brake arm 55.

Braking means 50 is actuated by squeezing brake handle 51 so that break handle is moved back against gripping portion 42C, which causes interior cable 53 to be pulled up and through exterior cable 52. As interior cable 53 is drawn upward, the first end of brake arm 55 is pulled toward back wall 58 causing brake arm 55 to pivot at pivot point 56. As the first end of brake arm 55 pivots toward back wall 58, brake foot 59 moves away from back wall 58 and presses against rear wheel 32 causing the rotation of wheel 32 to come to a stop. When the occupant is no longer squeezing handle 51, the tension of spring 54 causes brake arm 55 to return to a more vertical position and brake foot 59 is moved away from rear wheel 32.

Braking means 50 and the ratchet and sprocket system can also be utilized to prevent back sliding of the wheelchair on inclines. In order to use braking means 50 on an incline, braking means 50 is actuated by squeezing brake handle 51 during the backward stroke of handle 42 to keep the wheelchair from rolling backwards. Brake handle 51 is then released during the forward stroke of handle 42 which causes driving sprocket wheel 35 to be turned by the action of ratchet 41 and rear wheel 32 to turn in the forward direction.

The foregoing description of a braking means for the wheelchair is only an example of one of many types of braking means which may be incorporated into the wheelchair of the present invention. Other braking means, including cable braking means, are known in the art and commercially available.

As shown in best in FIG. 3, mobile support means 20 includes back 21, arms 23, support bar 24, front caster wheels 25 and rear caster wheels 26. Support means 20 is further provided with two brackets 22 for receiving the protrusions 31A of frame 31. Frame 31 is inserted into support means 20 by lining up protrusions 31A with brackets 22 in the support means, and then sliding protrusions 31A into brackets 22. Frame 31 of propulsion means 30 is secured to support means 20 by inserting bolts 91 through holes 92 in frame 31, through holes 27 in back 21 of support means 20, and then into nuts 93. Propulsion means 30 is removably engaged with support means 20 such that the propulsion means can be removed from one support means 20 and used to provide propulsion for additional support means 20, thus multiplying the number of patients that can be moved using one propulsion means. A footrest may optionally be attached to arms 23 of support means 20.

As shown in FIGS. 1, 2 and 3, support means 20 is further provided with chair receiving means 28. As shown in FIGS. 1 and 2, chair 10 is set into and removably secured in chair receiving means 28. Nuts and bolts are the presently preferred means of removably securing chair 10 in receiving means 28. However, other means of removably engaging chair 10 with receiving means 28, such as snap means and friction fit mean, will be readily apparent to those of ordinary skill in the art. Chair receiving means 28 can be varied to accommodate a variety of chair types, which allows the support means 20 and propulsion means 30 to be used with a variety of chair types. It is preferred that support means 20 be mobile so that when chair 10 is engaged with the support means, the support means and chair can be pushed by an attendant.

Chair 10 is optionally provided with a central opening 11 for facilitating toilet use. Due to the shape of support means 20, the wheelchair can be propelled forward over a toilet such that the occupant is sitting directly over the toilet bowl. Support bar 24 should be positioned so that the wheelchair can be moved over a toilet and so that bar 24 is not directly below opening 11. The central opening in chair 10 then enables the wheelchair occupant to use the toilet without having to get up from the chair. The opening in chair 10 is optionally provided with a removable lid. Alternatively, the lid can be hinged at one side of the opening. For comfort, chair 10 may also be provided with cushion 12.

I claim:

1. A wheelchair comprising:

a. A standalone chair assembly comprising a chair attached to a first frame having front and rear wheels, said chair and first frame assembly being movable on its wheels in its standalone form;

b. a second frame having multiple ground-engaging wheels and carrying propulsion means for driving said wheels; and c. means for releasably engaging said second frame to said standalone chair assembly, whereby, when said second frame and said chair assembly are engaged and said propulsion means are activated, said ground-engaging wheel is effective in propelling said chair assembly.

2. The wheelchair according to claim 1 wherein said propulsion means comprises a driving sprocket wheel and a driven sprocket wheel, said driven sprocket wheel being connected to said ground engaging wheel, wherein said sprocket wheels are operably connected, and wherein movement of said driving sprocket wheel results in movement of said ground engaging wheel.

3. The wheelchair according to claim 2 wherein movement is caused to said driving wheel by applying force to an attached handle in a forward and backward ratcheted motion.

4. The wheelchair according to claim 3 wherein said handle is attached to said driving sprocket wheel by a ratcheting means which engages and turns said driving sprocket wheel.

5. The wheelchair according to claim 4 wherein said ratcheting means includes a selection mechanism for changing the direction in which said ratcheting means turns said driving sprocket wheel.

6. The wheelchair according to claim 1 wherein said propulsion means is provided with a braking means.

7. The wheelchair according to claim 6 wherein a means for actuating said braking means is provided on said handle.

8. The wheelchair according to claim 1 wherein said chair has a central opening to facilitate toilet use.

9. The wheelchair according to claim 1 wherein said first frame has a front opening whereby the wheelchair may be propelled forward over a toilet to permit the occupant to sit directly over said toilet.

10. The wheelchair according to claim 1 wherein said second frame has front and rear wheels.

11. The wheelchair according to claim 1 wherein said second frame is U-shaped with a back member and two side members, and matching propulsion means are mounted on each side member.

* * * * *